United States Patent [19]

Murphy

[11] 3,805,229

[45] Apr. 16, 1974

[54] SELF-PULSING TRANSMITTER FOR VEHICLE TIRE PRESSURE INDICATION SYSTEM

[75] Inventor: John C. Murphy, Columbus, Ohio

[73] Assignee: Avco Corporation, Richmond, Ind.

[22] Filed: Sept. 15, 1972

[21] Appl. No.: 289,698

[52] U.S. Cl.............. 340/58, 325/111, 200/61.22
[51] Int. Cl............................................ B60c 23/04
[58] Field of Search ........ 340/58; 200/61.22, 61.25, 200/61.26; 325/15, 111, 117

[56] References Cited
UNITED STATES PATENTS

| | | | |
|---|---|---|---|
| 3,694,803 | 9/1972 | Strenglein | 340/58 |
| 3,588,815 | 6/1971 | Koonce | 340/58 |
| 2,860,321 | 11/1958 | Strickland et al. | 340/58 |

Primary Examiner—Alvin H. Waring
Attorney, Agent, or Firm—Bertram H. Mann

[57] ABSTRACT

A self-pulsed oscillator or transmitter and a pneumatic tire low pressure monitoring and warning system using same is provided wherein the transmitter comprises a transistor having base, emitter, and collector electrodes with the electrodes being operatively connected to a DC power source. The transmitter has oscillating means connected between the base electrode and the collector electrode establishing the frequency of the oscillator and employs a simple and inexpensive device to provide a self-pulsing action.

6 Claims, 5 Drawing Figures

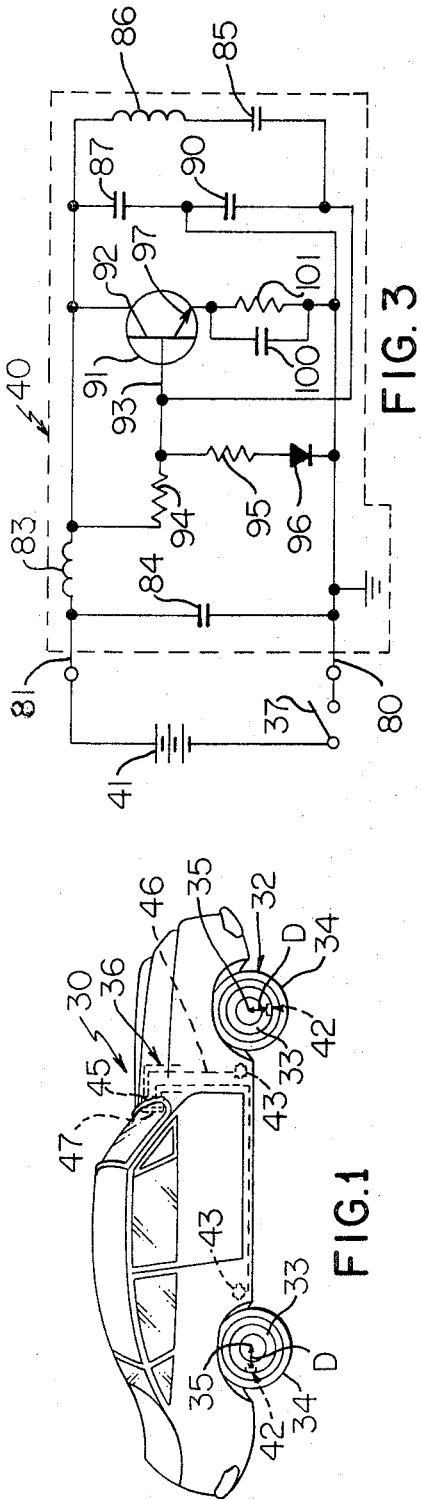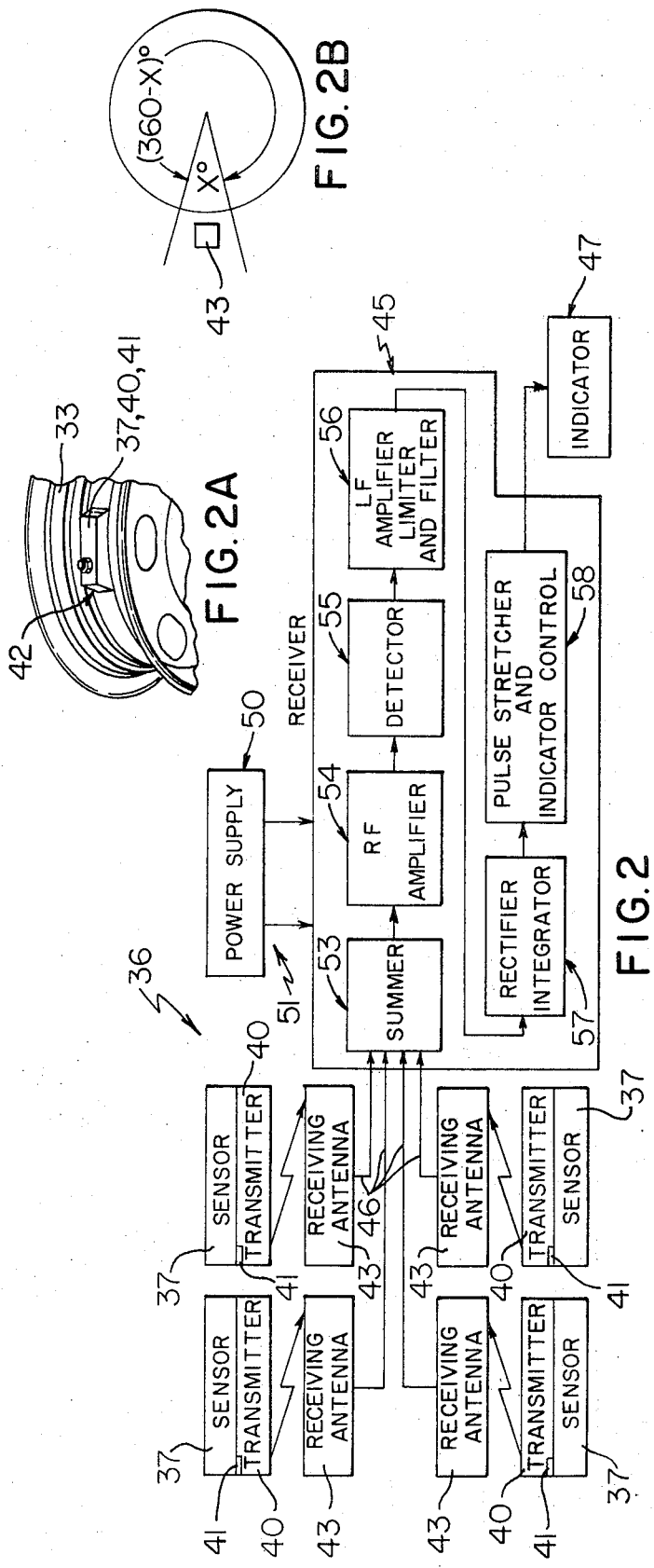

SELF-PULSING TRANSMITTER FOR VEHICLE TIRE PRESSURE INDICATION SYSTEM

BACKGROUND OF THE INVENTION

Self-pulsed oscillators or transmitters are used extensively in various electronic circuits and associated systems. For example, in a pneumatic tire low pressure monitoring and warning system employing a sensor which senses a low pressure condition in an associated tire and a transmitter which provides output signals at a radio frequency in response to the low pressure condition in such tire, it is important that the transmitter provide coded signals with readily identifiable characteristics to eliminate false alarms, yet such transmitter must be of simple, economical, and reliable construction.

SUMMARY

This invention provides an improved self-pulsed oscillator or transmitter and a pneumatic tire low pressure monitoring and warning system using same wherein the transmitter utilizes a transistor as the active element and such transmitter is of simple, economical, and reliable construction. In particular, the transmitter comprises a transistor having base, emitter, and collector electrodes operatively connected to a DC power source and has oscillating means connected between the base electrode and the collector electrode establishing the frequency of the oscillator. The transmitter requires the absolute minimum of only one active circuit and utilizes a simple and inexpensive device to provide the self-pulsing action.

Other details, uses, and advantages of this invention will be readily apparent from the embodiment thereof presented in the following specification, claims, and drawing.

BRIEF DESCRIPTION OF THE DRAWING

The accompanying drawing shows a present preferred embodiment of this invention, in which FIG. 1 is a perspective view illustrating an exemplary motor vehicle utilizing one embodiment of a pneumatic tire low pressure monitoring and warning system which has an improved self-pulsed oscillator or transmitter provided as an integral part thereof;

FIG. 2 is a schematic presentation of the exemplary system utilized in the vehicle of FIG. 1 wherein such system includes means sensing a low pressure condition in each pneumatic tire of the vehicle, an improved transmitter associated with each tire and actuated by its sensing means to provide output signals at a radio frequency, a receiving antenna operatively associated with each transmitter, a receiver operatively connected to the receiving antennas for receiving signals from the transmitters, and an indicator which provides an indication in the event of a low pressure condition in one or more tires;

FIG. 2A is a fragmentary view of a typical assembly comprised of a sensor, transmitter, and battery mounted on the hub of one of the tires of the vehicle of FIG. 1;

FIG. 2B is a schematic diagram highlighting that each receiving antenna receives a useable signal only during an angular portion of each rotation of its associated transmitter; and FIG. 3 is a schematic electrical circuit diagram of the improved transmitter of this invention which is utilized in the system of FIG. 2 and also schematically illustrating a battery and associated sensor connected to the transmitter.

DESCRIPTION OF THE OVERALL SYSTEM

Reference is now made to FIG. 1 of the drawings which illustrates a motor vehicle shown in this example of the invention as a four-wheeled passenger automobile 30 of well known construction which has a plurality of four wheel assemblies 32 and each wheel assembly 32 is comprised of a rotatable support in the form of a hub or rim 33 with each hub 33 carrying an associated tubeless tire 34, in a well known manner, which is inflated to a predetermined pressure with a suitable fluid such as ambient air. Each wheel assembly 32 is rotatable about an associated central axis of rotation 35 whereby the associated hub 33 and tire 34 are similarly rotatable about such central axis and in a well known manner. The vehicle 30 is powered by a suitable engine which usually drives two of the wheel assemblies 32, either the front or rear two, and the vehicle 30 utilizes one exemplary embodiment of the pneumatic tire low pressure monitoring and warning system of this invention which is designated generally by the reference numeral 36 and such system serves to warn the operator of the vehicle 30 in the event of an abnormally low fluid pressure, pneumatic pressure in this example, in any one of the four tires 34 and in a manner which will be presented in detail hereinafter.

For convenience and ease of presentation the exemplary system 36 has been illustrated as being used on a vehicle in the form of a passenger-type automobile having a plurality of four tubeless tires each of which is inflated to a predetermined pressure. However, it will be appreciated that the system is fully applicable to all types of vehicles employing either tubeless or tube-type pneumatic tires, or the like, including buses, trucks, trailers, and similar vehicles.

The system 36 comprises a plurality of four sensing means or sensors 37, see FIG. 2, and each sensor 37 is carried by an associated wheel assembly 32 and is preferably suitably installed in the hub 33 of its associated wheel assembly in a fixed manner. The detailed construction and operation of a typical sensor 37 will be presented subsequently.

The system 36 comprises a plurality of transmitters 40, each operatively connected to and being activated or actuated by an associated sensor 37 and in this example the sensor 37 and transmitter 40 associating with a particular wheel assembly 32 is provided with a self-contained power source in the form of a battery 41 and the sensor 37, transmitter 40, and battery 41 of each particular wheel assembly is provided as a single unit or assembly which is designated generally by the reference numeral 42, see FIG. 2A. The assembly 42 may be suitably installed within its associated hub 33 by threaded bolt, welding, or the like, and as a practical matter the assembly 42 and hence its transmitter 40 is located at a position which is radially displaced by a distance D from the central axis of rotation 35 of its wheel assembly 32, see FIGS. 1 and 2A.

The sensor 37 is comprised of a sealed pressurized hemispherical dome which dimples in a substantial predetermined manner when it is exposed to an external pressure greater than a predetermined minimum. The dimple action serves as a normally open electrical snap switch which closes by "oil can" action whenever the external pneumatic pressure falls below the predetermined minimum pressure which in reality is the minimum air pressure required to assure satisfactory operation of the associated tire 34.

The transmitter 40, which will also be referred to as oscillator 40, is actuated by the snap action of its sensor 37 whereby the associated battery 41 provides electrical power for the oscillator 40. The oscillator 40 is a self-pulsed oscillator which generates a radio frequency (RF) signal with a distinct, readily identifiable characteristics to eliminate false alarms. The oscillator utilizes a tank circuit having a coil which is unshielded and unobstructed to the greatest extent possible to establish an external magnetic alternating near field and thereby use such coil as the transmitting antenna. Each transmitter 40 operatively associates with an associated one of four fixed receiving antennas 43 comprising the system 36 and the antennas 43 will be described in detail subsequently.

For certain applications where it may be desired to take advantage of the minimal licensing requirements in the so-called citizen's band of radio frequencies ranging between 26.97 – 27.27 megahertz (Mhz), the oscillator frequency may be located within this band and the transmitter 40 then utilizes near field transmission. The median frequency in this band is 27.12 Mhz which corresponds to a wave length of 36.26 feet and such distance is considerably greater than the distance required for the system 36 of this invention to span from a hub 33 of any particular wheel assembly 32 of a vehicle using system 36 to a location on such vehicle where an antenna for the system is likely to be located.

The use of near field transmission has the distinct advantages that in the near field zone the stationary field is of greater magnitude than the traveling field, and attenuation of the stationary field per unit of distance is greater than that for the traveling field whereby interference with adjacent electrical apparatus as well as the electrical apparatus of the vehicle 30 is minimized. Further because transmission basically may be considered as the coupling between a stationary coil on a receiving antenna 43 and a rotating coil of an associated transmitter 40, such transmission will be controlled by the coupling factor whereby maximum magnetic coupling will provide maximum transmission.

Because of practical considerations of economy and simplicity in detecting a low pressure condition in a rotating pressurized tire, each transmitter assembly 42 and its transmitter 40 is preferably located off center, as indicated earlier, by the distance D from the central axis of rotation 35 of its associated wheel assembly 32 and hub 33. However, the assembly 42 is of small weight (roughly an ounce) and the weight thereof may be easily balanced by a regular small size automobile tire balancing weight, if desired.

With off center mounting, the previously mentioned coupling factor between a rotating transmitter 40 and the fixed coil of its receiving antenna 43 varies considerably as each wheel assembly rotates because of the variation in distance between such coils, changes in relative orientation between the coils, and the differences in shielding interposed between the coils at different relative positions thereof. As a result of these factors the transmitted output signal from the transmitter 40 is of sufficient strength to be useable only during a portion of each revolution or rotation of its wheel assembly 32. Stated in another manner, because each receiving antenna 43 is attached at a fixed position on the vehicle adjacent its wheel assembly 32, the antenna 43 receives a useable output signal from the transmitter only during a portion of each complete rotation of the transmitter therepast. However, since it is known that the magnetic near field varies inversely as the third power of distance, then the received signal during part of the rotation will be substantially stronger than the received signal would be if a more constant transmission distance was selected. The system 36 utilizes a receiver 45 which is operatively connected to each receiving antenna 43 by an associated coaxial cable 46 and the receiver employs unique means for increasing the effective time duration of the useable portions of the output signals from the transmitter 40 to activate or otherwise energize an associated indicator 47 comprising system 36 and such indicator is operatively connected to the receiver 45 in a manner to be described.

The indicator 47 may be of any suitable type. For example, such indicator may be in the form of a light which is observed visually or such indicator may be in the form of an audible indicator such as a bell or buzzer.

The system 36 in addition to the batteries 41 comprising assemblies 42, also has a power source for its receiver 45 and such power source is designated generally by the reference numeral 50 and is suitably operatively connected to the receiver 45 as illustrated at 51. The power source 50 may comprise any suitable source of power and in this example is the usual battery provided for the vehicle 30.

Each transmitter 40 is energized by a low pressure indication as determined by its sensor 37 and will provide continuous pulsed output signals. In general, only during certain time intervals associated ones of these signals are of sufficient strength that they are readily received by an associated receiving antenna 43 and as will now be explained particularly in connection with FIGS. 1 and 2B.

Under conditions wherein the vehicle 30 is standing still, the signal from a transmitter 40 is processed through the receiver 45 and may activate the indicator 47, such as an indicator lamp 47, so that the lamp 47 is ON or OFF depending upon the relative location of the transmitter 40 and receiving antenna 43. In those instances when the vehicle 30 is moving at a relatively low speed, the indicator lamp 47 will be turned ON and OFF sequentially; however, it has been found that the lamp 47, in this case, is turned ON for a sufficiently long time interval to assure full brightness and, conversely, when such lamp is turned OFF it is extinguished completely. With the vehicle moving at such slow speeds, the pulse of light will therefore be fully visible and the low pulse repetition rate will result in a flickering action by the lamp 47. If the vehicle 30 is moving at higher speeds the lamp 47 may be turned ON for a time period which is insufficient to insure full brightness. This performance of the lamp at higher vehicle speeds in combination with the higher pulse repetition rate due to faster rotation reduces the flickering; however, the total perceptible light may be inadequate tp be used as an indicator.

To highlight this situation reference is made to FIG. 2B of the drawings wherein it is seen that for each full rotation of a wheel the transmission level is high enough to activate or light the indicator lamp 47, for X degrees while such lamp is dark for the remaining (360–X) degrees. By way of an example, X may be 30°, in which case the indicator lamp will be dark for a period roughly 11 times as long as the lighted period. Thus, it can be readily seen that an operating transmitter 40 used in a pneumatic tire of a given size will generate a signal having a particular pulse frequency determined by the emission characteristics of the transmitter and the speed of the vehicle. It is also apparent that the performance of the indicator 47 may be substantially improved if the indicator On time or the time that it is activated is increased relative to its OFF time. In particular, the performance of the indicator 47 may be substantially improved if the effective time duration of a useable signal received by each receiving antenna 43 is increased and this may be achieved by a technique referred to popularly as pulse stretching and means for achieving such pulse stretching is provided in the receiver 45.

The receiver 45 minimizes false alarms by rejecting potentially false alarm inputs including; power supply disturbances generated by the electrical equipment of the vehicle 30, including the starter, horn, window washer, windshield wipers, key alrms, etc.; RF signals generated by natural atmospheric electrical disturbances such as static; RF signals generated by the above-mentioned electrical equipment of the vehicle 30; RF signals generated by electrical equipment external to the vehicle; voice-modulated as well as continuous-wave signals within the selected RF transmission band; and modulated as well as continuous-wave RF signals outside the selected band. Conversely, the RF receiver 45 very reliably recognizes and activates the indicator 47 when receiving a pneumatic tire low pressure warning signal in the form of an RF signal having all of the following characteristics of being in the selected RF band, being an RF signal which is pulsating at the predetermined frequency defined by the self-pulsed oscillator, and being an RF signal which is pulsating at a rate and with a pulse width determined by the angle X of rotation over which a recognizable signal is received in combination with the rotational velocity of an associated wheel assembly 32 of the vehicle 30.

The receiver 45 has an RF pass-band which is reduced to a minimum compatible with assured inclusion of the selected RF band under all environmental conditions and has means minimizing or eliminating the above-mentioned false alarm inputs while assuring recognition of a signal indicating a low tire pressure and as will be apparent from the following description. In particular, the receiver 45 has a summer 53 which receives RF signals from an RF transmission line 46 in the event of a low pressure condition in a vehicle tire associated therewith and such signals are then fed to an RF amplifier 54. The amplifier 54 employs a plurality of two transformer coupled stages having tuned primaries and untuned secondaries to amplify the RF signal whereby RF amplification is held at a minimum in view of its relatively high cost and regeneration problems usually associated therewith. The signals from the RF amplifier 54 are fed to a diode amplitude detector 55 which is forward biased to facilitate its ability to perform at very low signal levels and the detector 55 is followed by a low frequency (LF) amplifier, limiter, and filter circuit 56 which serves to attenuate undesired signals. The circuit 56 is a combination LF limiter/band pass amplifier which prevents LF signals on frequencies outside the predetermined frequency band of the oscillator from reaching a level which may activate the indicator. The circuit 56 is followed by a rectifier-integrator circuit 57 which integrates the LF pulses in the pulse train. This circuitry will assure that a pulse train rather than noise spikes is required to activate the indicator while the shortest authentic pulse train will suffice to let the rectified voltage reach a level which will activate succeeding or downstream circuits in the receiver. The circuit 57 thus serves to eliminate the effect of noise spikes and provides more reliable operation the longer the required integration time can be made. The circuit 57 is followed by a pulse stretcher and indicator control circuit 58 and this circuit is particularly useful in overcoming the effect of short trains of pulses. The circuit 58 serves as means for increasing the effective time duration of useable ones of the output signals provided to RF receiver 45 by receiving antennas 43 and insures that a satisfactory indicator signal is provided to the indicator 47. The pulse stretcher 58 is inherently a regenerative device whereby it also increases the sensitivity of the RF receiver since any signal which is capable of activating the pulse stretcher will provide a saturated output signals. The circuit 58 activates indicator 47 to warn the operator of the vehicle 30 in the event of a low pressure condition in any one of the vehicle tires. The receiver 45 also has suitable means in its power supply 51 for filtering such power supply to reduce power supply line disturbances to a tolerable level.

Having described the general operation of the system 36 in connection with the exemplary vehicle 30 a detailed description will now be presented of the improved oscillator of this invention and such oscillator or transmitter 40 is in the form of a self-pulsed or so-called "squegging" oscillator 40.

TRANSMITTER 40

The transmitter 40, see FIG. 3, is energized by its sensor 37 and powered by its battery 41 to operate whenever the pressure within its associated tire 34 falls below a preselected value. To eliminate or effectively minimize the number of false alarms it is desirable that the oscillator signal be coded to insure its positive recognition and a simple and unique method which may be used to code the signal employs pulse modulation of the oscillator output.

The transmitter or oscillator 40 is electrically connected to the sensor 37 by electrical lines 80 and 81 and the oscillator is separated from its battery 41 by the RF filter defined by coil 83 and capacitor 84.

The oscillator 40 provides optimum circuit simplicity and low cost inasmuch as it employs oscillating means having only one active circuit which includes a coil 86 and capacitors 85, 87 and 90. an analysis of the oscillator circuit will reveal that the utilization of the capacitor 85 causes coil 86 in series therewith to provide a series resonance which will exhibit a capacitive reactance below and an inductive reactance above the tuning frequency. Consequently, the capacitive impedance comprising capacitors 87 and 90 will resonate with the combination of coil 86 and capacitor 85 above the tuning frequency of the combination of components 85 and 86. However, assuming capacitor 85 is small compared to capacitors 87 and 90 then the tuning frequency will be determined almost exclusively by the characteristics of the coil 86 and capacitor 85 and the capacitors 87 and 90 will in essence overpower the characteristics of the transistor 91 connected in the circuit.

The voltages associated with transistor 91 are determined by the fact that the collector electrode or collector 92 of such transistor is connected directly to the power supply or battery 41 through lead 81, the base electrode or base 93 of such transistor is connected to a voltage divider network comprised of resistors 94–95 and diode 96. The diode 96 operates in the circuit to provide a voltage variable impedance which will insure operation at lower voltage levels than otherwise feasible. The emitter electrode or emitter 97 of transistor 91 is connected to ground through a parallel resistor-capacitor network comprised of capacitor 100 and resistor 101.

Regenerative feedback for the oscillator 40 circuit is similar to such feedback in the Colpitts oscillator and hence will not be discussed further because the Colpitts circuit is generally well known.

To understand the pulsed operation of oscillator 40 assume that the voltage across the capacitor-resistor combination 100–101 is so high that there is no regenerative or feedback action whereby under this condtion the oscillator cannot oscillate. However, if the charge on the capacitor 100 is permitted to leak off through the resistor 101, then oscillation will commence once the capacitor 100 reaches a given voltage. This oscillation will increase current flow through the emitter 97 and the voltage across the capacitor 100 will increase and may, with proper circuit constants, continue to increase until the oscillations stop and the above cycle of operation is repeated.

Thus, it is seen that the circuit for the transmitter or oscillator 40 is such that a self-pulsed transistor-oscillator is provided and the self-pulsing action is assured by selecting a value for the capacitor 100 which is far greater than required to effect an adequate RF bypass, selecting the time constant for the capacitor 100 and resistor 101 combination so that it is commensurate with the desired pulse repetition rate, and finally deliberately selecting a poor capacitor 100 or one that has a substantially poor dissipation factor, i.e., greater than 0.1 percent. This requirement of having a poor capacitor results not only in a reduction of the circuit cost but also provides the unique self-pulsed oscillator for the system 36.

The emitter voltage which will start the oscillation is considerably lower than that required to stop oscillation. This well known hysteresis effect results from the dynamic alternating voltages existing on an oscillating transistor and during part of the cycle the alternating voltages will produce sufficient regeneration to sustain the oscillation even though the DC voltages by themselves are unable to do so.

The oscillator 40 in this example is tuned to oscillate within a radio frequency band which may be the citizen's radio band from 26.97 to 27.27 mc operating with a repetition rate which may be 40 kc plus or minus 15 kc. The battery 41 used to power the oscillator 40 is preferably a mercury cadmium battery of known construction.

While present exemplary embodiments of this invention, and methods of practicing the same, have been illustrated and described, it will be recognized that this invention may be otherwise variously embodied and practiced within the scope of the following claims.

What is claimed is:

1. An RF transmitter for a pneumatic tire low pressure monitoring and warning system comprising: means sensing a low pressure condition in a pneumatic tire supported on an associated vehicle by a rotatable support; a self-pulsed transmitter having one active element, said transmitter carried by said rotatable support and being rotatable therewith; said transmitter being actuated by said sensing means and providing pulse modulated output signals in response to said low pressure condition; selective means for receiving said pulse modulated RF signals and insuring positive recognition of said pulse modulated RF signals generated by said RF transmitter wherein false alarms in an environment of high atmospheric and man-made electromagnetic interfering signals are eliminated; said active element comprising a transistor having base, emitter and collector electrodes; means connecting said electrodes to a DC power source; oscillating means connected to said base and collector electrodes and to said emitter electrode for establishing the operating frequency of said transmitter; and inactive means providing a self-pulsing action and establishing the pulse repetition rate.

2. An RF transmitter for a monitoring and warning system as set forth in claim 1 in which said inactive means providing self-pulsing action comprises a capacitor having a poor dissipation factor in parallel with a resistor, said capacitor and resistor operatively connected between the circuit ground for said oscillating means and said emitter electrode, said capacitor adapted to be charged to a maximum potential until current flow through said emitter electrode stops to thereby stop oscillation of said oscillating means, and when said capacitor is discharged to a potential less than said maximum potential then current flow through said emitter electrode again commences to thereby enable oscillation in said oscillating means, wherein the emitter potential which will start oscillation in said oscillating means is lower than the emitter potential required to stop oscillation thereof; said resistor and said capacitor having a time constant which establishes the desired pulse repetition rate.

3. An RF transmitter for a monitoring and warning system as set forth in claim 2 in which said capacitor has a dissipation factor greater than 0.1 per cent.

4. An RF transmitter for a monitoring and warning system as set forth in claim 1 and further comprising an RF filter separating said DC power source from said transistor electrodes.

5. An RF transmitter for a monitoring and warning system as set forth in claim 2 in which said transistor is an NPN transistor.

6. An RF transmitter for a monitoring and warning system as set forth in claim 1 wherein said oscillating means is a tank circuit including a coil which is unshielded and unobstructed to establish an alternating near field and thereby permit the use of said coil as a transmitting antenna which couples to said receiving means.

* * * * *